US012719955B2

(12) United States Patent
Tsuchihashi

(10) Patent No.: US 12,719,955 B2
(45) Date of Patent: Aug. 25, 2026

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Masakazu Tsuchihashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 192 days.

(21) Appl. No.: 18/589,209

(22) Filed: Feb. 27, 2024

(65) Prior Publication Data

US 2024/0297920 A1 Sep. 5, 2024

(30) Foreign Application Priority Data

Mar. 2, 2023 (JP) ................................. 2023-032177

(51) Int. Cl.
*H04L 67/06* (2022.01)
*H04L 12/46* (2006.01)
*H04L 67/141* (2022.01)
*H04L 67/143* (2022.01)

(52) U.S. Cl.
CPC ............ *H04L 67/141* (2013.01); *H04L 67/06* (2013.01); *H04L 67/143* (2013.01)

(58) Field of Classification Search
CPC ......... H04L 67/06; H04L 67/56; H04L 69/16; H04L 69/165
See application file for complete search history.

(56) References Cited

U.S. PATENT DOCUMENTS 8,423,529 B1 * 4/2013 Bloomstein ........... G06F 16/188 707/706
2005/0198380 A1 * 9/2005 Panasyuk ............ H04L 63/0272 709/239
2008/0172457 A1 * 7/2008 Chen .................. H04L 41/5096 709/203
2010/0322252 A1 * 12/2010 Suganthi ............. H04L 61/2503 709/237
2012/0284757 A1 * 11/2012 Rajapakse ........ H04N 21/41407 725/81
2013/0205022 A1 * 8/2013 Kagan ..................... H04L 67/56 709/224

FOREIGN PATENT DOCUMENTS

JP H08305643 A 11/1996

* cited by examiner

*Primary Examiner* — Christopher B Robinson
*Assistant Examiner* — Ho T Shiu
(74) *Attorney, Agent, or Firm* — Canon U.S.A., Inc. IP Division

(57) ABSTRACT

A communication apparatus, comprising: at least one memory that stores a set of instructions; and at least one processor that executes the instructions, the instructions, when executed, causing the communication apparatus to perform operations comprising: establishing a plurality of connections with an external apparatus for data transfer; executing transfer processing that transfers data to the external apparatus by using the plurality of connections; detecting a transfer error in the transfer processing; and executing, in a case where the transfer error is detected in one connection of the plurality of connections, disconnection processing that disconnects the one connection and also disconnects the other connection of the plurality of connections other than the one connection, wherein in the transfer processing, FTP or FTPS is used as a transfer protocol.

10 Claims, 9 Drawing Sheets

| | SET1 | SET2 | ··· | SET20 |
|---|---|---|---|---|
| COMMUNICATION MODE | FTP TRANSFER | FTP TRANSFER | ··· | – |
| LAN TYPE | WIRELESS | WIRED | ··· | – |
| WIRELESS SETTING | AP1 | – | ··· | – |
| TCP/IP SETTING | IP1 | IP2 | ··· | – |
| FTP SETTING | FTP1 | FTPS1 | ··· | – |

| FTP SETTING NAME | FTP1 |
|---|---|
| FTP MODE | FTP |
| URL | http://xxx |
| USER | user01 |
| PASS | xxxxx |
| MAXIMUM NUMBER OF IMAGES TO BE TRANSFERRED SIMULTANEOUSLY | 2 |

FIG. 4A

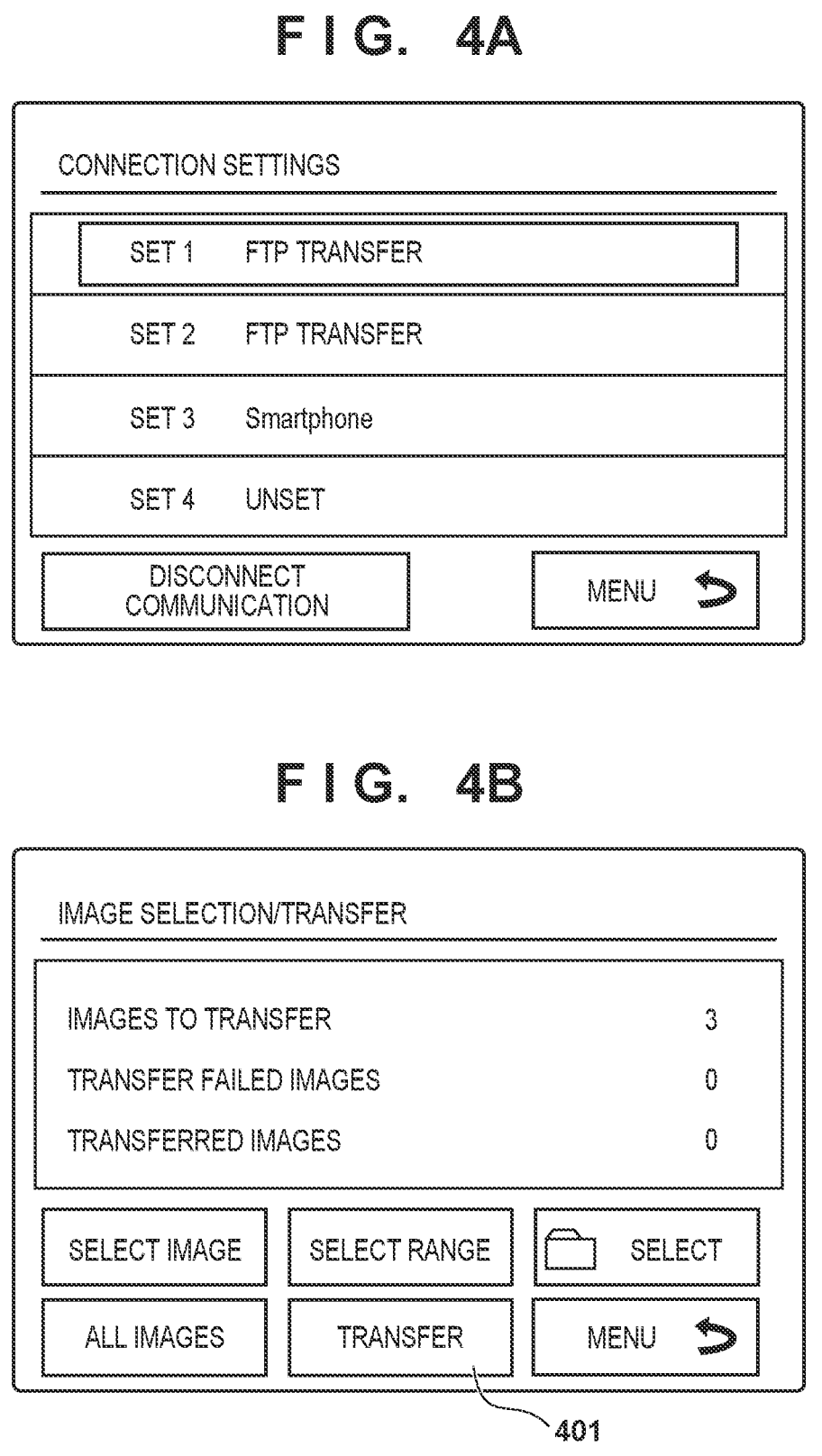

CONNECTION SETTINGS

SET 1 FTP TRANSFER

SET 2 FTP TRANSFER

SET 3 Smartphone

SET 4 UNSET

DISCONNECT COMMUNICATION

MENU

FIG. 4B

IMAGE SELECTION/TRANSFER

IMAGES TO TRANSFER 3

TRANSFER FAILED IMAGES 0

TRANSFERRED IMAGES 0

SELECT IMAGE

SELECT RANGE

SELECT

ALL IMAGES

TRANSFER

MENU

401

IMAGE SELECTION/TRANSFER

| | |
|---|---|
| IMAGES TO TRANSFER | 0 |
| TRANSFER FAILED IMAGES | 0 |
| TRANSFERRED IMAGES | 3 |

SELECT IMAGE | SELECT RANGE | SELECT

ALL IMAGES | TRANSFER | MENU

FIG. 4E

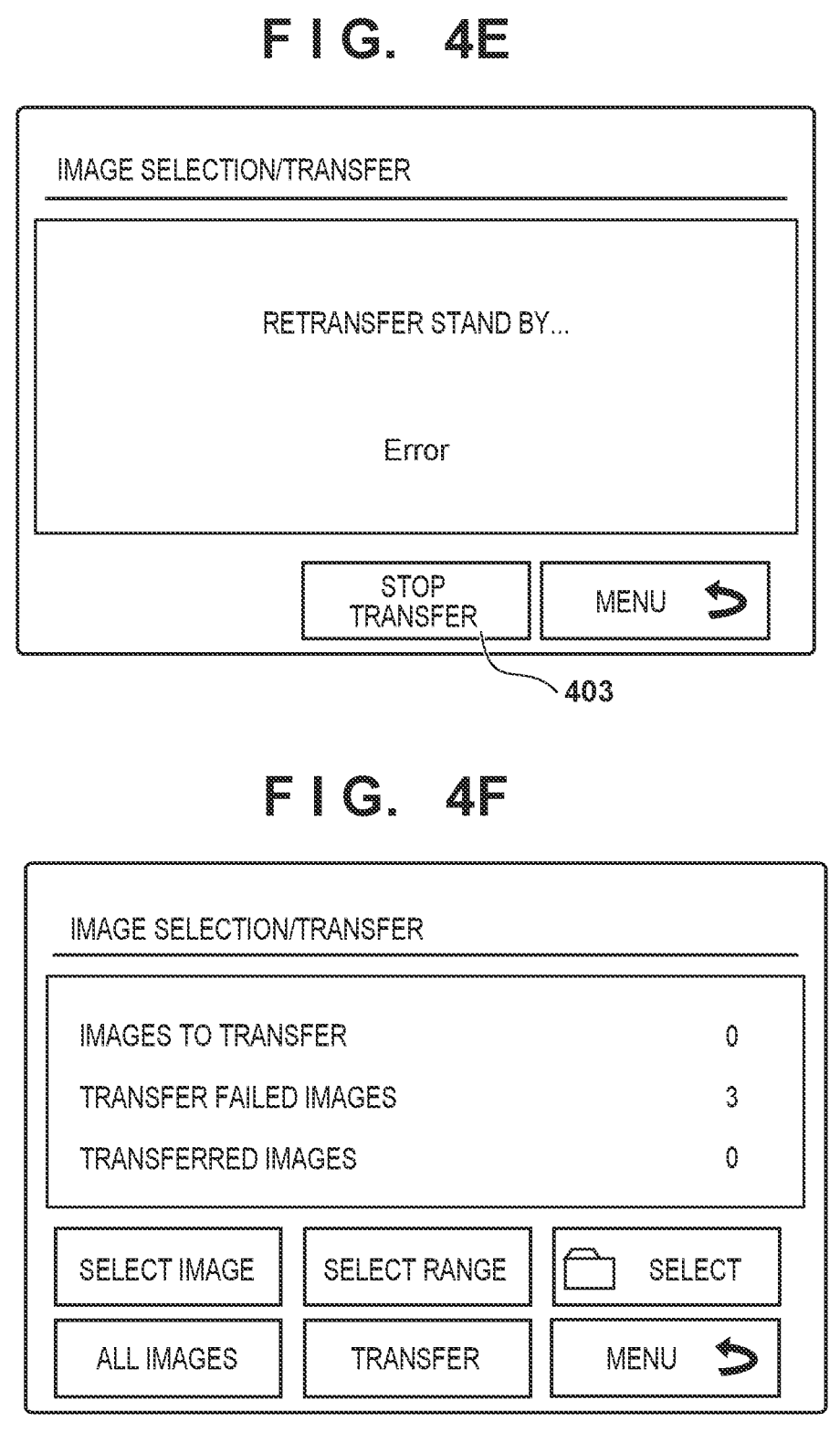

IMAGE SELECTION/TRANSFER

RETRANSFER STAND BY...

Error

STOP TRANSFER

MENU

IMAGE SELECTION/TRANSFER

IMAGES TO TRANSFER 0

TRANSFER FAILED IMAGES 3

TRANSFERRED IMAGES 0

SELECT IMAGE

SELECT RANGE

SELECT

ALL IMAGES

TRANSFER

MENU

F I G. 5A
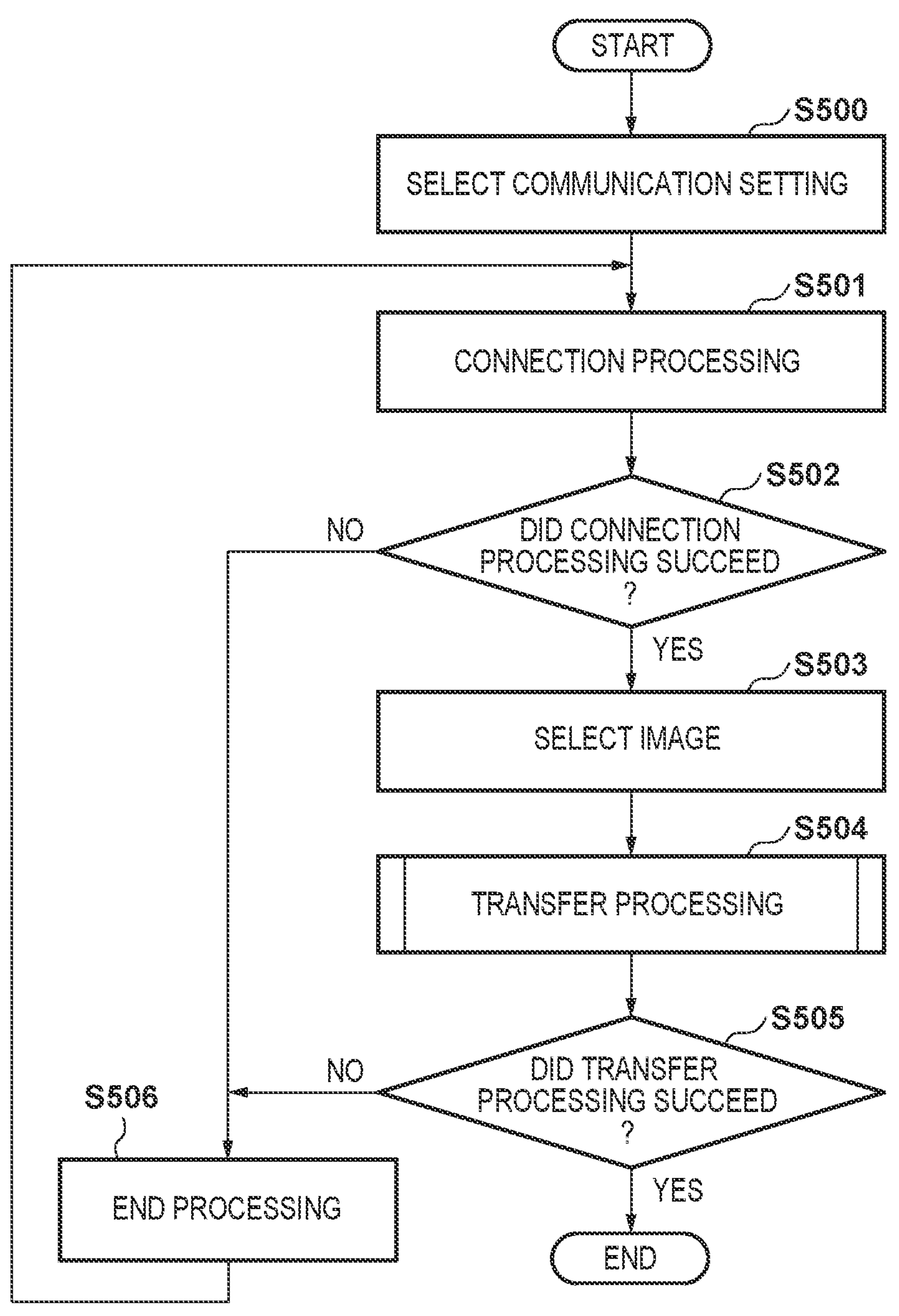

FIG. 7

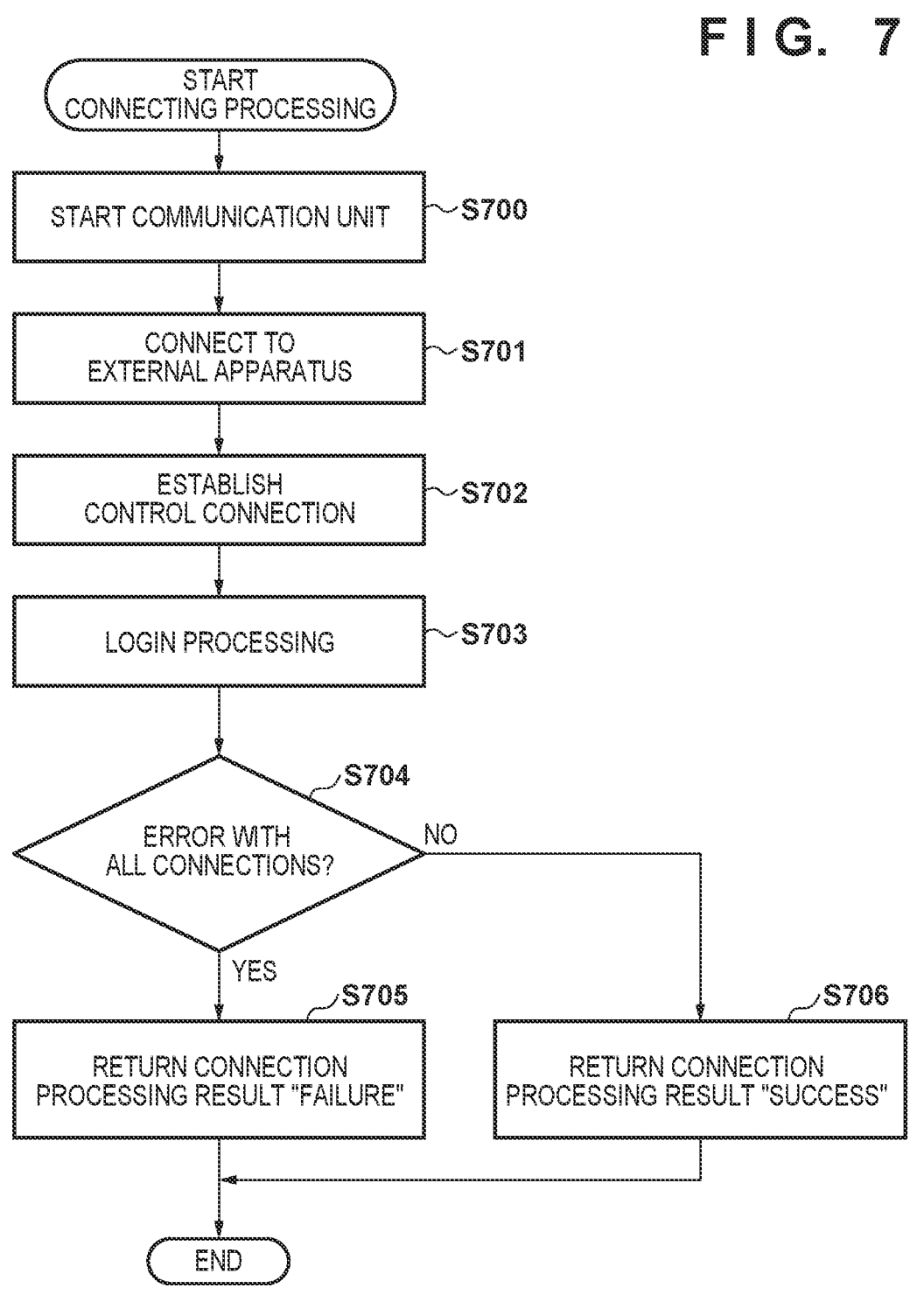

START CONNECTING PROCESSING

START COMMUNICATION UNIT (S700)

CONNECT TO EXTERNAL APPARATUS (S701)

ESTABLISH CONTROL CONNECTION (S702)

LOGIN PROCESSING (S703)

ERROR WITH ALL CONNECTIONS? (S704)

YES

NO

RETURN CONNECTION PROCESSING RESULT "FAILURE" (S705)

RETURN CONNECTION PROCESSING RESULT "SUCCESS" (S706)

END

COMMUNICATION APPARATUS, METHOD FOR CONTROLLING COMMUNICATION APPARATUS, AND STORAGE MEDIUM

BACKGROUND

Field of the Disclosure

The present disclosure relates to a communication apparatus, a method for controlling a communication apparatus, and a storage medium, and particularly relates to a technique for transferring a plurality of files in parallel between communication apparatuses.

Description of the Related Art

In recent years, a camera function and a communication function are provided in many electronic equipment such as a personal computer, a digital camera, a game console, a tablet terminal, and a mobile phone, and data transmission and reception between these electronic equipment are realized. Some electronic equipment connect to a file transfer protocol (FTP) server, and transfer image data captured by a camera to the FTP server. Communication between the electronic equipment and the FTP server is performed by using two transmission control protocol (TCP) connections. One connection is called a control connection, which is used to exchange commands for controlling communication such as login and setting of a transfer method. The other connection is called a data connection, which is used for transmission and reception of data. By establishing a plurality of the two connections between the electronic equipment and the FTP server, it is possible to increase the amount of data that can be exchanged and to speed up the data transfer. Japanese Patent Laid-Open No. 8-305643 discloses a method of dividing transfer data into N pieces and transmitting and receiving data through N connections.

On the other hand, when the data transfer is performed by using the plurality of data connections, handling in a case of error needs to correspond to the data transfer of the plurality of data connections.

For example, it is here assumed a situation that a trouble occurs on a communication path between a client and a server and a response to a request from the client cannot be obtained from the server. When an error is detected in one connection due to timeout in waiting for the response, a timeout error in waiting for the response from the server similarly occurs in other connections using the same communication path and communicating with the same server. At this time, there is a time difference between when the error occurs in the first connection and when the error occurs in the last connection. This is because there is a difference in the start timing of the waiting for the response due to a difference in the timing of issuing the request for each of the connections. When a situation occurs in which the response from the server cannot be obtained, communication with the server may be recovered by resetting the communication function of the electronic equipment once, and restarting it again from a physical connection. In particular the case of a portable electronic equipment such as a camera, an issue often occurs with communication due to a change in the surrounding communication environment, so the reset of the communication function often works effectively.

However, in order to reset the communication function, all of the connections need to have an error. Even when an error is detected in one connection, if the other connections are in a state of waiting for the response from the server, the electronic equipment is in a communicating state, and reset and reconnection processing cannot be started. For example, there is a need for a sports cameraman, such as a sports cameraman working for a newspaper company, to transfer a photograph captured in a stadium or the like to a server of the company as soon as possible, and it is thus desired to solve troubles with such a communication promptly.

SUMMARY

Embodiments of the present disclosure have been made in light of the above-described issue, and provide a technique for realizing a prompt recovery even when a transfer error occurs in performing data transfer in parallel by using a plurality of connections.

According to embodiments of the present disclosure, there is provided a communication apparatus, comprising: at least one memory that stores a set of instructions; and at least one processor that executes the instructions, the instructions, when executed, causing the communication apparatus to perform operations comprising: establishing a plurality of connections with an external apparatus for data transfer; executing transfer processing that transfers data to the external apparatus by using the plurality of connections; detecting a transfer error in the transfer processing; and executing, in a case where the transfer error is detected in one connection of the plurality of connections, disconnection processing that disconnects the one connection and also disconnects the other connection of the plurality of connections other than the one connection, wherein in the transfer processing, File Transfer Protocol (FTP) or File Transfer Protocol over SSL/TLS (FTPS) is used as a transfer protocol.

Further features of the present disclosure will become apparent from the following description of exemplary embodiments (with reference to the attached drawings).

BRIEF DESCRIPTION OF THE DRAWINGS

FIG. 4A is a diagram illustrating an example of a display screen of the digital camera when performing FTP image transfer, according to the embodiment.

FIG. 4B is a diagram illustrating an example of the display screen of the digital camera when performing the FTP image transfer, according to the embodiment.

FIG. 4E is a diagram illustrating an example of the display screen of the digital camera when performing the FTP image transfer, according to the embodiment.

FIG. 4F is a diagram illustrating an example of the display screen of the digital camera when performing the FTP image transfer, according to the embodiment.

FIG. 5A is a flowchart illustrating a procedure of processing performed by the digital camera when the FTP image transfer is performed, according to the embodiment.

FIG. 7 is a flowchart illustrating a procedure of connection processing performed by the digital camera, according to a third embodiment.

DESCRIPTION OF THE EMBODIMENTS

Figure 1:
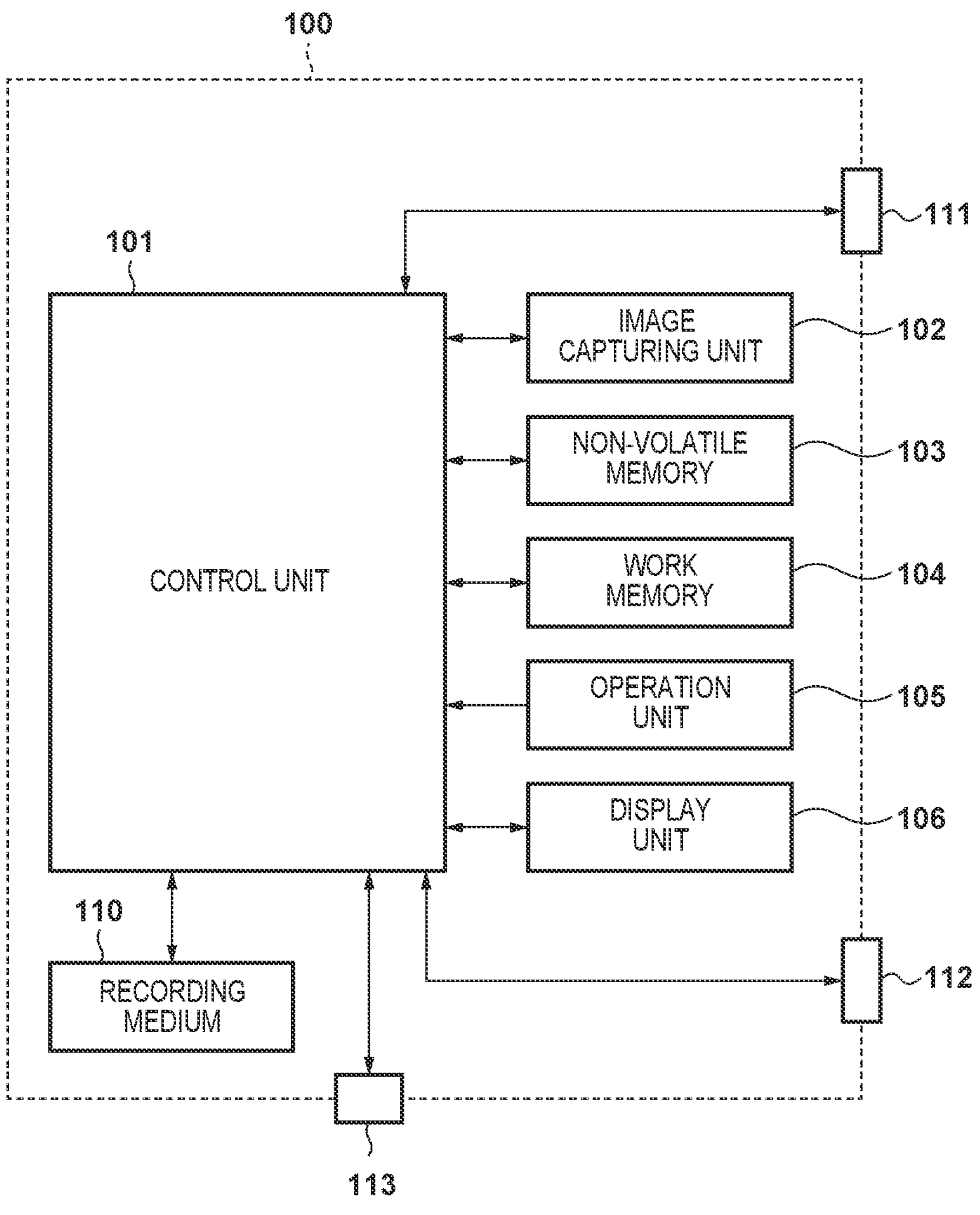
FIG. 1 is a block diagram illustrating a configuration of a digital camera, which is an example of a communication apparatus according to an embodiment.

Hereinafter, embodiments will be described in detail with reference to the attached drawings. Note, the following embodiments are not intended to limit the scope of the disclosure. Multiple features are described in the embodiments, but limitation is not made in the disclosure to require all such features, and multiple such features may be combined as appropriate. Furthermore, in the attached drawings, the same reference numerals are given to the same or similar configurations, and redundant description thereof is omitted.

First Embodiment

When a plurality of connections is used to communicate with the same transmission destination, if an error occurs in any one of the connections, there is a high possibility that similar error also occurs in the other connection. In a first embodiment, an example will be described in which, when the same communication path is used for the same transmission destination, at a timing when an error occurs in any one of the connections, communication of all the connections is disconnected assuming that the error has occurred therein.

According to this configuration, it is possible to omit a time of waiting for a response until an occurrence of timeout, and resetting and restarting of a communication function can be speeded up. In the present embodiment, a flow of processing when an error occurs during image transfer processing will be described as an example.

Configuration of Digital Camera 100

FIG. 1 is a block diagram illustrating a configuration of a digital camera 100, which is an example of a communication apparatus according to the present embodiment. Note that, although the digital camera will be described as an example of the communication apparatus, the communication apparatus is not limited thereto. For example, the communication apparatus may be a portable media player, a so-called tablet device, or an information processing apparatus such as a personal computer.

A control unit 101 is, for example, constituted by one or more central processing units (CPUs), and controls each component of the digital camera 100 in accordance with an input signal or a program described below. Note that, instead of the control unit 101 controlling the entire apparatus, controlling the entire apparatus may be performed by a plurality of units of hardware sharing the processing.

An image capturing unit 102 includes, for example, an optical system that can control a diaphragm, zoom, focus, and the like, and an imaging element configured to convert light (video) introduced via the optical system into an electrical video signal. As the imaging element, a complementary metal oxide semiconductor (CMOS), a charge coupled device (CCD), or the like is generally used. Under the control of the control unit 101, the image capturing unit 102 converts light of an object formed by a lens included in the image capturing unit 102, to an electrical signal by using the imaging element, and performs noise reduction processing and the like to output digital data as image data. In the digital camera 100 according to the present embodiment, the image data is recorded in a recording medium 110 in accordance with the Design Rule for Camera File system (DCF) standard.

A non-volatile memory 103 is one or more memories, is an electrically erasable and recordable non-volatile memory, and stores a program or the like executed by the control unit 101. A work memory 104 is one or more memories, and is used as a buffer memory that temporarily holds the image data captured by the image capturing unit 102, an image display memory of a display unit 106, a work area or the like of the control unit 101.

An operation unit 105 is used to receive instructions to the digital camera 100 from a user. The operation unit 105 includes, for example, a power button for the user to instruct ON/OFF of the power of the digital camera 100, a release switch configured to instruct capturing, and a playback button configured to instruct playback of image data. The operation unit 105 may further include an operation member such as a dedicated connection button configured to start communication with an external apparatus via a communication unit 111 described below. The operation unit 105 may also include a touch panel formed at the display unit 106 described below. Note that the release switch includes a SW1 and a SW2. When the release switch is in a so-called half-pressed state, the SW1 is turned on. By this operation, instructions can be received for making preparations for image capturing such as auto focus (AF) processing, auto exposure (AE) processing, auto white balance (AWB) processing, flash preliminary emission (EF) processing, and the like. When the release switch is in a so-called full-pressed state, the SW2 is turned on. By this operation, instructions for capturing can be received.

The display unit 106 performs display of a viewfinder image at a time of capturing, display of captured image data, display of characters used for interactive operations, and the like. Note that the display unit 106 need not necessarily be built in the digital camera 100. For example, various displays may be performed via a display unit included in an information processing apparatus provided outside the digital camera 100. In other words, the digital camera 100 may be connected to the internal or external display unit 106, and may have at least a display control function that controls display of the display unit 106.

The recording medium 110 can record the image data output from the image capturing unit 102. The recording medium 110 may be configured to be attachable to and detachable from the digital camera 100, or may be built in the digital camera 100. In other words, the digital camera 100 may have at least a function of accessing the recording medium 110.

The communication unit 111 is an interface configured to connect to an external apparatus. The communication unit 111 has various communication functions such as USB, IEEE 1394, P1284, SCSI, modem, LAN, RS232C, and wireless communication. A connector (in the case of wired communication) or an antenna (in the case of wireless communication) configured to connect the digital camera 100 to the external apparatus can be connected to the communication unit 111. The digital camera 100 according to the present embodiment can exchange data with the external apparatus via the communication unit 111. For example, the digital camera 100 can transmit image data (data item) generated by the image capturing unit 102 to the external apparatus via the communication unit 111. In the present embodiment, the communication unit 111 includes an interface configured to communicate with the external apparatus via a so-called wireless LAN conforming to the IEEE 802.11 standard.

Note that the communication unit 111 need not necessarily be built in the digital camera 100. The digital camera 100 may be connected to the internal or external communication unit 111, and may have at least a communication control function that controls the communication unit 111. The control unit 101 realizes wireless communication with the external apparatus by controlling the communication unit 111. Note that the communication method is not limited to the wireless LAN, and another communication method such as an infrared communication method may be used. In the present embodiment, the communication unit 111 also includes an interface configured to communicate with the external apparatus via a wired LAN.

A short-range wireless communication unit 112 includes, for example, an antenna for wireless communication, a modulation/demodulation circuit configured to process a wireless signal, and a communication controller. The short-range wireless communication unit 112 outputs a modulated wireless signal from the antenna, and demodulates a wireless signal received by the antenna. According to this configuration, short-range wireless communication conforming to the IEEE 802.15 standard (so-called Bluetooth (trade name)) can be realized. In the present embodiment, the Bluetooth (trade name) communication employs version 4.0 of Bluetooth (trade name) Low Energy, which achieves low power consumption. This Bluetooth (trade name) communication has a narrower communicable range (that is, a shorter communicable distance) than the wireless LAN communication. In addition, the communication speed of the Bluetooth (trade name) communication is slower than that of the wireless LAN communication. On the other hand, the Bluetooth (trade name) communication consumes less power than the wireless LAN communication. The digital camera 100 according to the present embodiment can exchange data with the external apparatus via the short-range wireless communication unit 112. For example, when a command for capturing is received from the external apparatus, the digital camera 100 controls the image capturing unit 102 to perform a capturing operation, and when the digital camera 100 has received a command for exchanging data by the wireless LAN communication, the digital camera 100 controls the communication unit 111 to start the wireless LAN communication.

A close-proximity wireless communication unit 113 includes, for example, an antenna for wireless communication, a modulation/demodulation circuit configured to process a wireless signal, and a communication controller. The close-proximity wireless communication unit 113 outputs a modulated wireless signal from the antenna, and demodulates a wireless signal received by the antenna. According to this configuration, the close-proximity wireless communication unit 113 can realize contactless close-proximity communication conforming to the ISO/IEC 18092 standard (so-called near field communication (NFC)). The close-proximity wireless communication unit 113 according to the present embodiment is disposed at a side portion of the digital camera 100.

The digital camera 100 and a smart device (not illustrated) start communication and are connected to each other by bringing respective close-proximity wireless communication units close to each other. Note that, when the connection is performed by using the close-proximity wireless communication units, the close-proximity wireless communication units need not necessarily be brought into contact with each other. Since the close-proximity wireless communication units can communicate with each other even when they are separated from each other by a certain distance, in order to connect the equipment to each other, the equipment may be brought close to each other within a range in which the close-proximity wireless communication is possible. In the following description, bringing close to the range in which the close-proximity wireless communication is possible will be also referred to as “bringing close to each other”.

When the close-proximity wireless communication units are within a range in which the close-proximity wireless communication is not possible, communication is not started. Further, in a case where the close-proximity wireless communication units are within the range in which the close-proximity wireless communication is possible and the communication connection is established, if the close-proximity wireless communication units move away from each other and enter into the range in which the close-proximity wireless communication is not possible, the communication connection is canceled. Note that the contactless close-proximity communication realized by the close-proximity wireless communication unit 113 is not limited to NFC, and another wireless communication standard may be employed. For example, contactless close-proximity communication conforming to the ISO/IEC 14443 standard may be employed as the contactless close-proximity communication realized by the close-proximity wireless communication unit 113.

In the present embodiment, the communication speed of the communication realized by the communication unit 111 is faster than the communication speed of the communication realized by the close-proximity wireless communication unit 113. In addition, the communication realized by the communication unit 111 has a wider communicable range than the communication by the close-proximity wireless communication unit 113. Instead, since the communication partner can be limited by the narrowness of the communicable range of the communication by the close-proximity wireless communication unit 113, processing such as exchange of an encryption key necessary for the communication realized by the communication unit 111 is not required. In other words, communication can be performed more easily than when the communication unit 111 is used.

Note that the communication unit 111 of the digital camera 100 in the present embodiment has an AP mode in which the communication unit 111 operates as an access point in an infrastructure mode, and a CL mode in which the communication unit 111 operates as a client in the infrastructure mode. By causing the communication unit 111 to operate in the CL mode, the digital camera 100 according to the present embodiment can operate as a CL equipment in the infrastructure mode. When the digital camera 100 operates as the CL equipment, the digital camera 100 can participate in a network formed by an AP equipment by connecting to the AP equipment in the vicinity of the digital camera 100.

Further, by causing the communication unit 111 to operate in the AP mode, the digital camera 100 according to the present embodiment can also operate as a simplified AP, which is a type of the AP but has more limited functions. When the digital camera 100 operates as the simple AP, the digital camera 100 forms a network by itself. An apparatus in the vicinity of the digital camera 100 can recognize the digital camera 100 as an AP equipment, and can participate in the network formed by the digital camera 100. As described above, the program for operating the digital camera 100 is held in the non-volatile memory 103.

Note that, although the digital camera 100 according to the present embodiment is a type of the AP, the digital camera 100 is the simple AP that does not have a gateway function for transferring data received from a CL equipment to an Internet provider or the like. Therefore, even if the digital camera 100 receives data from another apparatus participating in the network formed by the digital camera 100, the digital camera 100 cannot transfer the data to a network such as the Internet.

Outline of Connection Mode

A use case may be considered in which a user wants to transfer an image captured by the digital camera 100 to an external apparatus. In the present embodiment, an example will be described in which an image is transferred from the digital camera 100 to an FTP server by using File Transfer Protocol (FTP). FTP is one of communication protocols for transferring files over a network.

Figures 2, 3A, 3B:
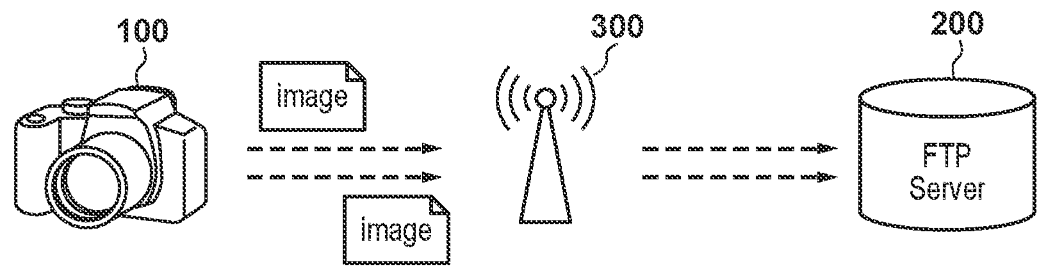
FIG. 2 is a diagram schematically illustrating a connection mode between the digital camera and an FTP server according to the embodiment.
FIG. 3A is a diagram illustrating an example of a communication setting according to the embodiment.
FIG. 3B is a diagram illustrating an example of the communication setting according to the embodiment.

FIG. 2 is a diagram schematically illustrating a connection mode between the digital camera 100 and an FTP server 200 according to the present embodiment. The digital camera 100 and the FTP server 200 are participating in a wireless LAN network formed by an external access point 300, which is an example of an external relay apparatus. The digital camera 100 can perform FTP connection with the FTP server 200 by designating and connecting to the FTP server 200.

Note that, although an example in which the digital camera 100 and the FTP server 200 are connected via the wireless LAN network is illustrated in FIG. 2, the digital camera 100 and the FTP server 200 may be connected via the wired LAN. After the FTP connection is completed, the user can transfer an image to the FTP server 200 by designating an image to be transferred and instructing the start of transfer in the digital camera 100.

In addition to the function of designating and transferring the image, there are functions such as a function of automatically transferring a captured image at the time of capturing, and a function of transferring only an image when the user presses a determination button at the time of image playback. In the present embodiment, the digital camera 100 and the FTP server 200 establish a plurality of connections by establishing a plurality of the control connections and a plurality of the data connections respectively corresponding to the plurality of control connections. Then, a plurality of image transfers is simultaneously performed in parallel from the digital camera 100 to the FTP server 200 by using the plurality of connections.

Connection to FTP Server and Mechanism of Image Transfer

Next, a flow of processing of connecting the digital camera 100 to the FTP server 200 will be described with reference to FIG. 3A, FIG. 3B, and FIG. 4A. FIG. 3A is a diagram illustrating an example of a communication setting stored in the non-volatile memory 103. In the present embodiment, it is assumed that 20 of the communication settings from SET1 to SET20 can be stored. Examples of the communication setting include a communication mode, a LAN type, a wireless setting, a TCP/IP setting, and an FTP setting.

The “communication mode” includes FTP transfer, PC transfer, Smartphone, HTTP server, and the like, and indicates which communication mode is used to connect to the external apparatus. The “LAN type” indicates whether the LAN is the wireless LAN or the wired LAN. The “wireless setting” includes information of SSID, an authentication method, an encryption type, an encryption key, a channel, and the like, which are used in performing communication via the wireless LAN. In accordance with the “wireless setting”, for example, Wi-Fi (trade name) connection can be established to the external access point. Wi-Fi (trade name) is wireless communication that uses an international communication standard of wireless communication IEEE 802.11 series (IEEE 802.11a, IEEE 802.11b, IEEE 802.11g, IEEE 802.11n, IEEE 80211ac, and the like). In the “wireless setting”, a plurality of settings may be held and connection may be established with any one of a plurality of the external access points. The “TCP/IP setting” includes TCP/IP information of the digital camera 100, which is used in communication with the external apparatus. Specifically, the “TCP/IP setting” includes information such as an IP address, a gateway, and a domain name system (DNS).

FIG. 3B illustrates an example of the “FTP setting” used in the communication setting. The “FTP setting” includes information of an FTP mode (FTP/FTPS), identification information (IP address, URL, or the like) of the FTP server, login information (user name and password), and the maximum number of images to be simultaneously transferred, and the like. FTPS is an abbreviation for File Transfer Protocol over SSL/TLS. The maximum number of images to be simultaneously transferred is the maximum number of images to be simultaneously transferred in parallel to one FTP server, and the number of control connections and the number of data connections established in the FTP server are determined based on this maximum number.

The digital camera 100 can store the communication setting as illustrated in FIG. 3A and FIG. 3B at a time when the digital camera 100 newly connected to an external apparatus, and thus the digital camera 100 can easily connect to the same (corresponding) external apparatus by using the stored communication setting for a second time connections or later. In the present embodiment, it is assumed that the communication setting as illustrated in FIG. 3A and FIG. 3B is stored in the digital camera 100 in advance.

FIG. 4A is a diagram illustrating an example of a screen of a list of connection settings from which the user selects which SET of the communication settings is to be used in connecting to the external apparatus by using the communication setting illustrated in FIG. 3A and FIG. 3B. By selecting a desired connection destination from among the SETs displayed in the list, the user can connect the digital camera 100 to the connection destination of the selected SET.

Processing

Next, a flow of processing from connecting the digital camera 100 to the FTP server 200 to transferring an image will be described with reference to FIG. 4A to FIG. 4F and FIG. 5A.

At step S500 in FIG. 5A, the control unit 101 selects the communication setting to be used by the digital camera 100. The selection of the communication setting can be performed by the control unit 101 displaying a screen as illustrated in FIG. 4A on the display unit 106, and receiving selection from the user. In the present embodiment, it is assumed that SET1 is selected. When the communication setting is selected, the processing proceeds to step S501.

At step S501, the control unit 101 performs a series of connection processing including connection processing from a physical layer to a network layer in accordance with the selected communication setting, and establishment processing of the control connection. The control unit 101 acquires the communication setting corresponding to the selected SET1 from among the communication settings stored in the non-volatile memory 103, and starts the connection processing. In the connection processing, start-up of the communication unit 111 according to the "LAN type" and connection to a wireless equipment according to the "wireless setting" are performed. Then, setting of its own IP address according to the "TCP/IP setting", establishment of the control connection to the FTP server according to the "FTP setting", login processing (user authentication processing), and the like are performed. When the "LAN type" is the wireless LAN, for example, a Wi-Fi (trade name) function is turned on between the digital camera 100 and the external access point 300. The number of control connections to be established with the FTP server is determined according to the "maximum number of images to be simultaneously transferred" to the FTP server prescribed in the "FTP setting". As described above, the "maximum number of images to be simultaneously transferred" is the maximum number of images to be simultaneously transferred in parallel to one FTP server. For example, when two images are to be simultaneously transferred, two of the control connections are established. The maximum number of images to be simultaneously transferred is designated by the user in advance when the communication setting is created, and is included in the above-described "FTP setting" and stored. When the connection processing ends, the processing proceeds to step S502.

At step S502, the control unit 101 checks the result of the connection processing. When the connection processing is successfully completed, the processing proceeds to step S503. On the other hand, when the connection processing has failed, the processing proceeds to step S506.

At step S503, the control unit 101 receives selection of the image to be transferred to the FTP server 200. Selectable images are images stored in the recording medium 110, and the user operates a selection screen to select the image from the selectable images. Examples of a selection method include a method of selecting images one by one, a method of designating a range of a list of images, a method of designating a folder in which images are stored, a method of selecting all images stored in a camera, and the like. FIG. 4B illustrates an example in which three images are selected to be transferred. The number of selected images is indicated by the number of "images to be transferred". When a transfer button 401 is pressed, reception of the image selection is completed, and the processing proceeds to step S504.

Figures 4C, 4D:
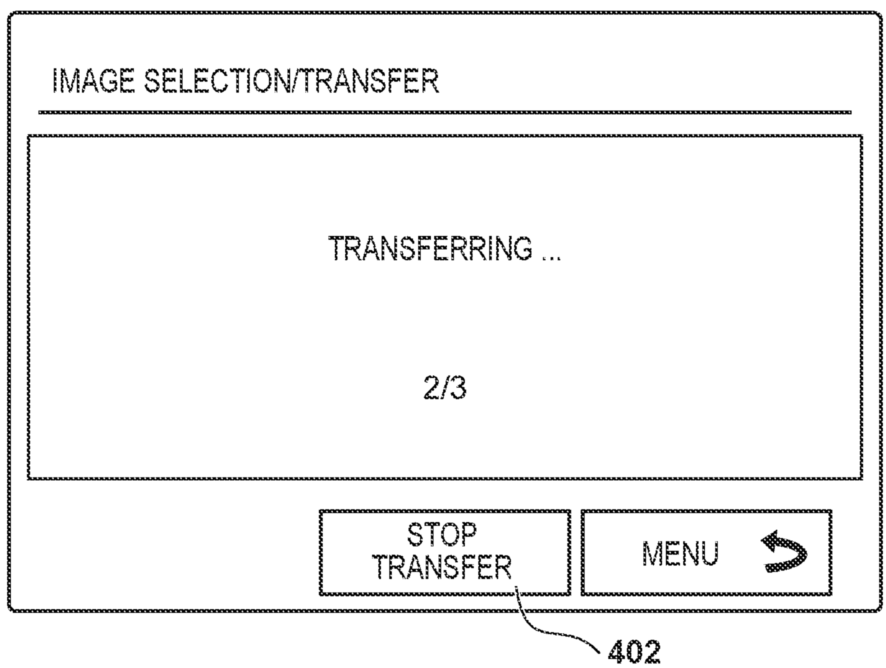
FIG. 4C is a diagram illustrating an example of the display screen of the digital camera when performing the FTP image transfer, according to the embodiment.
FIG. 4D is a diagram illustrating an example of the display screen of the digital camera when performing the FTP image transfer, according to the embodiment.

At step S504, the control unit 101 performs transfer processing of the selected image. During the transfer processing, a screen as illustrated in FIG. 4C is displayed indicating that the progress of the image transfer can be ascertained. Note that the content of processing at step S504 will be described below in detail with reference to FIG. 5B. When the transfer processing ends, the processing proceeds to step S505.

At step S505, the control unit 101 checks the result of the transfer processing. When the transfer processing is successfully completed, the processing ends. When the transfer processing is successfully completed, a screen as illustrated in FIG. 4D is displayed. The number of images successfully transferred is indicated by the number of "transferred images". After the processing ends, the communication function may be terminated as at step S506 described below, or the processing may return to step S503 to wait for selection of the next transfer image while the connection with the server is maintained. On the other hand, when the transfer processing has failed, the processing proceeds to step S506.

At step S506, the control unit 101 stops the communication unit 111 to end the communication function. For example, the communication is disconnected by turning off the Wi-Fi (trade name) function. Thereafter, as illustrated in FIG. 4E, a screen is displayed indicating that an error (for example, an error caused by timeout) has occurred and re-transfer processing is scheduled to be performed. Then, the processing returns to step S501, the Wi-Fi (trade name) function is turned on once again, and reconnection processing to the FTP server 200 is started.

As the communication setting used in the reconnection processing, the communication setting selected previously at step S500 is used. When the reconnection processing is successfully completed, the processing proceeds to the image selection at step S503 via step S502, but here, the user is not allowed to perform the image selection, and an image that is not transferred is automatically selected from the images previously selected by the user. For example, when the user has selected three images, two images have been successfully transferred, but an error has occurred in transferring the third image, only the third image is automatically selected. Finally, by proceeding to step S504 and performing the transfer processing in the same manner, the processing can be restarted as continuing from the previous transfer.

When an error occurs, by performing the processing at step S506 and step S501, the communication unit 111 is restarted (for example, the Wi-Fi (trade name) function is reset). The issue may be resolved by simply restarting the communication unit 111 (turning on/off the Wi-Fi (trade name) function), or the issue may be resolved by connecting to another external access point when settings of a plurality of external access points are held in the wireless setting. Further, the issue may be resolved by reassigning the IP address by an external DHCP server.

When a transfer stop button 402 on a transfer-in-progress screen illustrated in FIG. 4C, or a transfer stop button 403 on a re-transfer standby screen illustrated in FIG. 4E is pressed, the processing is stopped and the operation of the communication function is terminated. In this case, a screen as illustrated in FIG. 4F is displayed. FIG. 4F illustrates an example in which transfer of all the selected images has failed. The number of images whose transfer has failed is indicated by the number of "transfer failed images". In the illustrated example, the number of "transfer failed images" is three.

Handling of Error during Transfer Processing

Next, a flow of the transfer processing according to the present embodiment will be described in detail with reference to FIG. 5B. This processing is detailed processing at step S504 described with reference to FIG. 5A.

At step S510, the control unit 101 establishes the data connection between the digital camera 100 and the FTP server 200. There are two types of establishment methods, and when the connection mode is a passive mode, the data connection can be established by acquiring a port number from the server (FTP server 200) and connecting to the port from the client (digital camera 100). When the connection mode is an active mode, the server (FTP server 200) is notified of the port number of the client (digital camera 100), and the data connection is established by the server connecting to the port. Designation of the connection mode and transmission and reception of the port number are performed by using the control connection. The number of data connections to be established is at least as many as the number of control connections established at step S501 in FIG. 5A. For example, when the number of control connections established at step S501 is two, the number of data connections to be established may be two. Thus, two connections can be established between the digital camera 100 and the FTP server 200. When the establishment of the data connection is completed, the processing proceeds to step S511.

At step S511, the control unit 101 performs data transfer by using the data connection established at step S510. Exchange of information regarding the start and end of the data transfer is performed by using the control connection. When a file transfer request is issued from the client (digital camera 100) to the server (FTP server 200) and a transfer permission is granted from the server to the client, the client starts transfer of image data by using the data connection. At this time, when two of the data connections are established, the image data is transferred via the two data connections.

Subsequently, at step S512, the control unit 101 checks whether or not an error has occurred during the data transfer. When an error has occurred in any one of the plurality of data connections and the plurality of control connections established between the digital camera 100 and the FTP server 200, the processing proceeds to step S513. Here, not only the state of the data connection, but also the state of the control connection is monitored, when an error occurs in at least one of the control connections and the data connections, the processing proceeds to step S513. On the other hand, if no error has occurred in any of the connections, the processing proceeds to step S515.

At step S513, the control unit 101 disconnects the connection in which the error has occurred, and also disconnects the other connections established between the digital camera 100 and the FTP server 200. For example, when two connections are established, a first connection among the two connections in which an error has occurred is disconnected, and a second connection in which no error has occurred is also disconnected. More specifically, it is assumed that, with respect to the first connection (session) corresponding to a set of the control connection and the data connection, an error has occurred in at least one of the control connection and the data connection. In this case, the first connection (session) is disconnected, and the second connection (another session) in which no error has occurred corresponding to another set of the control connection and the data connection is also disconnected. Thereafter, the processing proceeds to step S514 at which "failure" is returned as the result of the transfer processing and the processing is terminated.

At step S515, the control unit 101 checks whether or not the data transfer is completed. When the data transfer is not completed, the processing returns to step S511, and the data transfer processing is continued without a break. On the other hand, when the data transfer is completed, the processing proceeds to step S516 at which "success" is returned as the result of the transfer processing and the processing is terminated.

As described above, in the present embodiment, when a transfer error occurs in any of the connections while the digital camera 100 is performing the image transfer processing by using the plurality of connections, the digital camera 100 disconnects the connection in which the transfer error occurs and also disconnects the other connections. As a result, it is possible to immediately terminate the communication function and start the reconnection processing. Therefore, for example, when the image transfer cannot be performed due to a trouble in the communication environment, the transfer processing can be restarted promptly. Even if a transfer error occurs when the data transfer is performed in parallel by using a plurality of connections, the transfer processing can be recovered promptly by the digital camera 100 stopping and retrying the Wi-Fi (trade name) function.

Second Embodiment

Figure 5B:
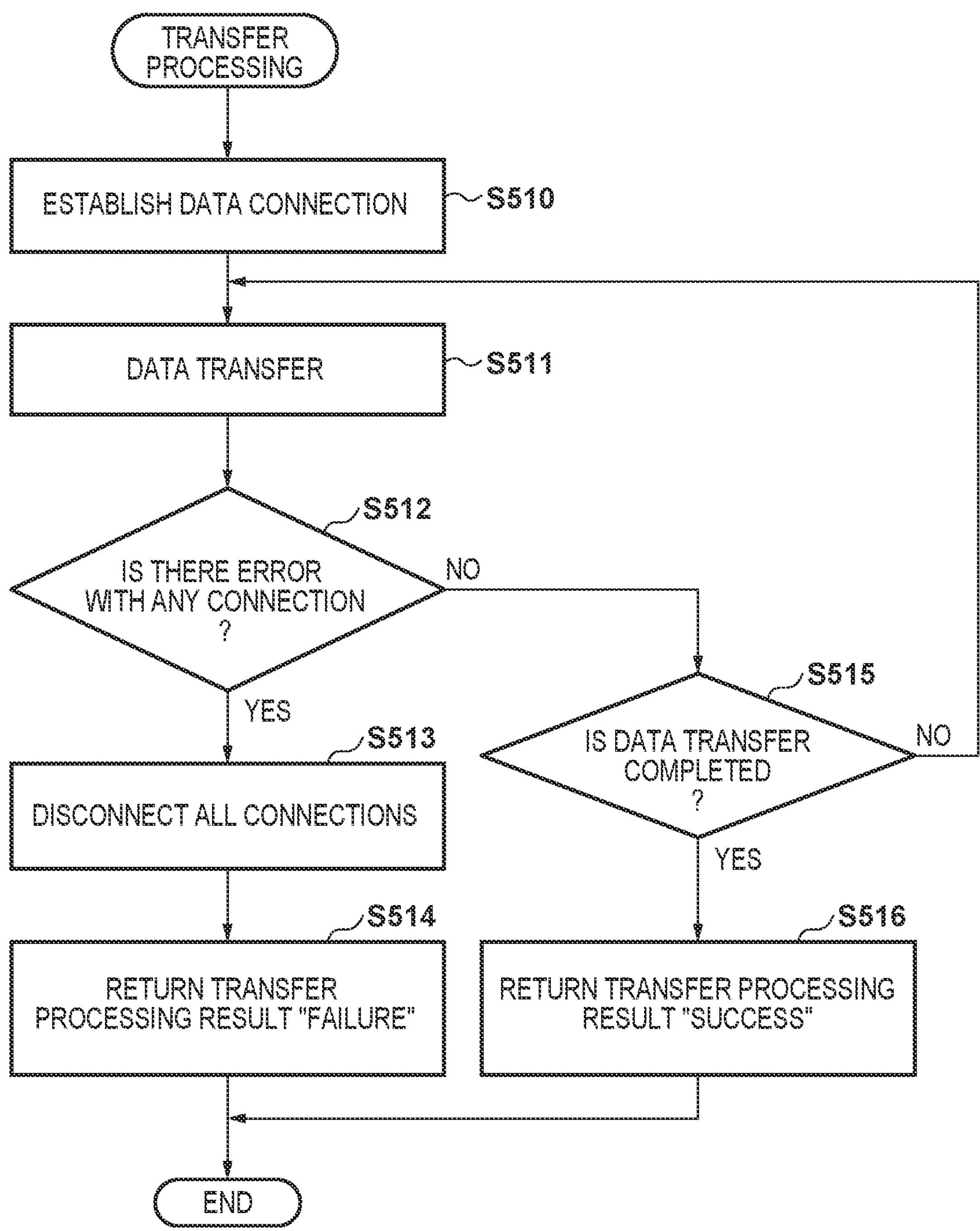
FIG. 5B is a flowchart illustrating a procedure of transfer processing performed by the digital camera, according to a first embodiment.

In the first embodiment, handling of an error when an image is transferred to one external apparatus has been described by using FIG. 5A and FIG. 5B. On the other hand, in a second embodiment, handling of an error when an image is transferred to a plurality of external apparatuses in parallel will be described. The number of connections to be established with each of the external apparatuses is plural in order to improve the transfer speed as in the above-described embodiment. For example, a plurality of first connections is established with a first external apparatus, and a plurality of second connections are established with a second external apparatus.

In order to transmit an image to the plurality of external apparatuses in parallel, connections are respectively established with the plurality of external apparatuses, and image data is transferred in parallel by using the established connections. In a case where an error is detected during the transfer, if all the connections established with the plurality of external apparatuses are disconnected as in the first embodiment, the connection in which transfer is being performed may also be disconnected. When communication paths to the external apparatuses are different from each other, even if an error is detected in one of the connections, the same error does not necessarily occur in all of the connections. For example, a case is considered in which the plurality of first connections (control connections and data connections) are established with the first external apparatus and the plurality of second connections (control connections and data connections) are established with the second external apparatus. In this case, even if an error occurs in one connection of the plurality of first connections established with the first external apparatus, an error does not necessarily occur in the plurality of second connections established with the second external apparatus.

When prompt restart of the communication unit is preferred, all the connections with the plurality of external apparatuses may be disconnected, but when priority is given to the continuation of the transfer over the restart of the communication unit, it is preferable to continue the transfer without disconnecting the connection in which no error is occurring. In the present embodiment, disconnection of the connection with the external apparatus in which a transfer error has occurred, and disconnection of the other connections established with the external apparatus, which has established the connection in which the transfer error has occurred, are performed. Then, an example will be described in which transfer is continued in the connections with the other external apparatuses in which the transfer can be performed.

Note that, since the system configuration and the apparatus configuration of the second embodiment are the same as those of the first embodiment, the description thereof will be omitted.

Processing

Figure 6:
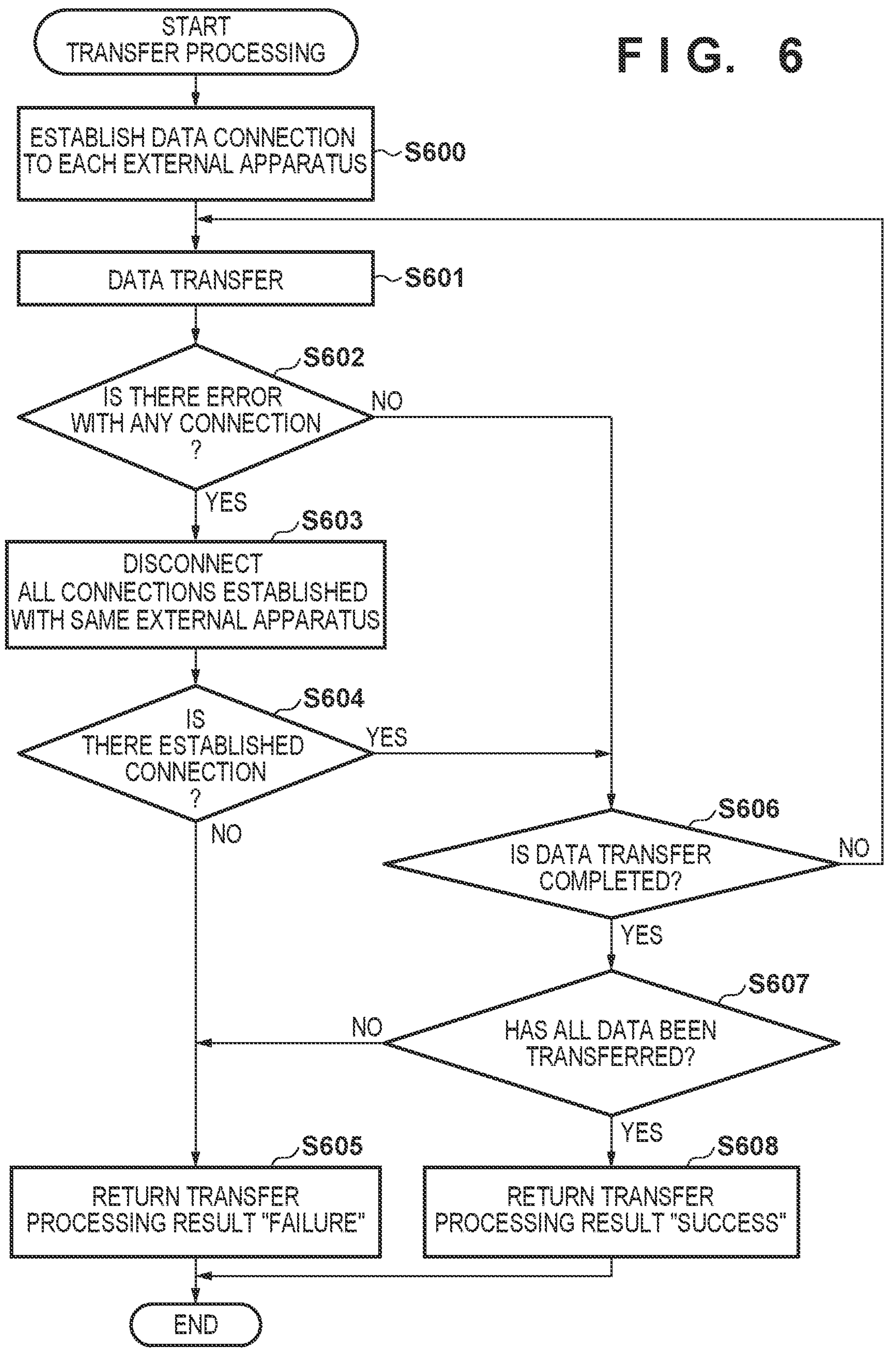
FIG. 6 is a flowchart illustrating a procedure of the transfer processing performed by the digital camera when the digital camera communicates with a plurality of external apparatuses, according to a second embodiment.

A flow of processing performed by the digital camera 100 according to the present embodiment will be described with reference to FIG. 5A and FIG. 6.

At step S500, the control unit 101 selects the communication setting to be used by the digital camera 100. At this time, the user is instructed to select a plurality of the communication settings for the plurality of external apparatuses. For example, the selection of a plurality of the SETs is received from the screen as illustrated in FIG. 4A, and the connection processing is started. Here, it is assumed that SET1 and SET2 are selected. For example, it is assumed that SET1 is selected for connection with the first external apparatus and SET2 is selected for connection with the second external apparatus. When the communication setting is selected, the processing proceeds to step S501.

At step S501, the control unit 101 acquires, from among the communication settings stored in the non-volatile memory 103, the communication settings corresponding to SET1 and SET2 selected at step S500, and starts the connection processing. For example, the connection processing with the first external apparatus is started by using the communication setting corresponding to SET1, and the connection processing with the second external apparatus is started by using the communication setting corresponding to SET2. Details of the connection processing are as described in the first embodiment. When the connection processing ends, the processing proceeds to step S502.

Since the processing at step S502 is the same as that of the first embodiment, detailed description thereof will be omitted. Here, when both the connection processing with the first external apparatus and the connection processing with the second external apparatus are successfully completed, the processing proceeds to step S503. On the other hand, if at least one of the connection processing with the first external device and the connection processing with the second external device has failed, the processing proceeds to step S506.

At step S503, the control unit 101 receives selection of an image to be transferred. The image to be transferred may be individually selected for each of the external apparatuses, or a common image to be transferred may be selected for the plurality of external apparatuses. When the transfer button 401 as illustrated in FIG. 4B is pressed, the processing proceeds to step S504.

At step S504, the control unit 101 performs transfer processing of the selected image. Details of the transfer processing will be described below with reference to FIG. 6. When the transfer processing ends, the processing proceeds to step S505. Here, since the processing at step S505 and step S506 is the same as that of the first embodiment, the description thereof will be omitted.

Next, the transfer processing at S504 will be described in detail with reference to FIG. 6. At step S600, the control unit 101 establishes the data connection between each of the external apparatuses and the digital camera 100. The processing described at step S510 is performed on each of the external apparatuses. For example, a plurality of first data connections is established with the first external apparatus, and a plurality of second data connections are established with the second external apparatus. When the establishment of the data connection with each of the external apparatuses is completed, the processing proceeds to step S601.

At step S601, the control unit 101 performs data transfer to each of the external apparatuses by using the established data connections. The processing at step S511 described with reference to FIG. 5B in the first embodiment is performed on each of the external apparatuses. For example, data transfer is performed by using the plurality of first data connections established with the first external apparatus, and data transfer is performed by using the plurality of second data connections established with the second external apparatus.

At step S602, the control unit 101 checks whether or not an error has occurred during the data transfer. For example, when an error has occurred in either of the connection established with the first external apparatus or the connection established with the second external apparatus, the processing proceeds to step S603. For example, it is assumed that a plurality of first connections (a plurality of sets of the control connection and the data connection) are established with the first external apparatus. Further, it is assumed that a plurality of second connections (for example, a plurality of sets of the control connection and the data connection) are established with the second external apparatus. At this time, with respect to one connection of the plurality of first connections of the first external apparatus, when an error occurs in at least one of the control connection and the data connection, the processing proceeds to step S603. On the other hand, if no error has occurred in any of the connections, the processing proceeds to step S606.

At step S603, the control unit 101 disconnects the connection in which the error has occurred, and also disconnects the other connections established with the external apparatus with which the connection in which the error has occurred is established. For example, when an error has occurred in one of the plurality of first connections established with the first external apparatus, the connection in which the error has occurred is disconnected. In addition, all the other connections of the plurality of first connections established with the first external apparatus are also disconnected. On the other hand, the plurality of second connections established with the second external apparatus is not disconnected. This is because the cause for occurrence of an error is different in different types of LANs, namely, the wireless LAN (SET1) and the wired LAN (SET2), and thus the error does not necessarily always occur in both of the LAN types.

Note that, even when connections are established with the same external apparatus, if there is a connection established by using a different communication setting, control may be performed not to disconnect that connection. Specifically, a case will be considered in which a plurality of connections is established with one external apparatus by using both a first communication setting (for example, SET1) and a second communication setting (for example, SET2). In this case, it is assumed that an error has occurred in one of the plurality of connections based on the first communication setting (SET1). At this time, the connection in which the error has occurred among the plurality of connections established with the external apparatus based on the first communication setting is disconnected, and all the other connections of the plurality of connections established with the external apparatus based on the first communication setting are also disconnected. However, control may be performed not to disconnect the plurality of second connections established with the external apparatus based on the second communication setting. As already explained, this is because the cause for occurrence of an error is different in different types of LANs, namely, the wireless LAN (SET1) and the wired LAN (SET2), and thus the error does not necessarily always occur in both of the LAN types. When the connections are disconnected at this step, the processing proceeds to step S604.

At step S604, the control unit 101 checks whether or not there is any established connection. When there is no established connection, the processing proceeds to step S605 at which "failure" is returned as the result of the transfer processing, and the processing is terminated. On the other hand, when there is an established connection, the processing proceeds to step S606.

At step S606, the control unit 101 checks whether or not the data transfer processing is completed. When the data transfer processing is not completed, the processing returns to step S601 and the data transfer processing is continued without a break. On the other hand, when the data transfer processing is completed, the processing proceeds to step S607.

At step S607, the control unit 101 checks whether or not all the scheduled data is transferred. If a transfer error has occurred and all the data is not transferred, the processing proceeds to step S605 at which "failure" is returned as the result of the transfer processing, and the processing is terminated. Here, the result of the transfer processing may include information about the external apparatus and the image with which the transfer processing has failed. On the other hand, when all the data is transferred, the processing proceeds to step S608, "success" is returned as the result of the transfer processing, and the processing is terminated.

As described above, in the present embodiment, the connection in which the transfer error has occurred is disconnected, and the other connection established with the external apparatus with which the connection is established in which the error has occurred, is also disconnected, but transfer is continued in the connections with the other external apparatus in which the transfer can be performed. According to this configuration, when an image is transferred to a plurality of external apparatuses, priority is given to the transfer processing to the external apparatus to which the image can be transferred, and when it becomes unable to transfer the image to any of the external apparatuses, the transfer can be resumed promptly.

Note that, in the present embodiment, priority is given to the continuation of the transfer processing, but when priority is given to the recovery of the communication path in which the transfer error has occurred, control may be performed such that the communication function is restarted at the time when the error is detected, as in the first embodiment. The user may select in advance which of the continuation of the transfer processing and the recovery of the communication path should be given priority.

Third Embodiment

Modified Example of Connection Processing

In a third embodiment, a description will be given of processing performed when all of the plurality of control connections cannot be established in the connection processing at step S501 in each of the above-described embodiments. In each of the above-described embodiments, when the control connections cannot be established for the maximum number of images to be simultaneously transferred, it is determined at step S502 that the connection processing has failed, and the transfer processing is not continued. On the other hand, some FTP servers limit the number of connections that can be established simultaneously. In order to deal with such a limitation, it is necessary to change the setting such that the number of control connections simultaneously established by the client is reduced, but such operation is cumbersome for the user.

In the present embodiment, an example will be described with reference to the flowchart illustrated in FIG. 7, in which even when all of the control connections cannot be established in the connection processing, the transfer processing is continued by using the control connections that can be established. Note that, since the system configuration and the apparatus configuration of the third embodiment are the same as those of the first embodiment, the description thereof will be omitted.

Processing

FIG. 7 is a diagram illustrating detailed processing of the connection processing at step S501 illustrated in FIG. 5A. At step S700, the control unit 101 starts up the communication unit 111 in accordance with the "LAN type" of the communication setting. When the start-up of the communication unit 111 is completed, the processing proceeds to step S701.

At step S701, the control unit 101 connects to the external apparatus. Specifically, connection to the external access point according to the "wireless setting" of the communication setting, setting of its own IP address according to the "TPC/IP setting" of the communication setting, and connection up to the transport layer of the FTP server according to the "FTP setting" of the communication setting are performed. At this step, Wi-Fi (trade name) connection is established between the digital camera 100 and the external access point 300. When the connection is completed, the processing proceeds to step S702.

At step S702, the control unit 101 establishes the control connection with the external apparatus (FTP server 200). Here, the number of control connections to be established is determined in accordance with "the maximum number of images to be simultaneously transferred (to the FTP server)" included in the "FTP setting" of the communication setting (see FIG. 3B). When the control connection is established, the processing proceeds to step S703.

At step S703, the control unit 101 performs login processing with respect to the external apparatus by using the established control connection. The login processing is performed by using an FTP command. The user name and the password used in the login processing are stored in the "FTP setting" of the communication setting (see FIG. 3B). When the login processing is completed, the processing proceeds to step S704.

At step S704, the control unit 101 checks whether or not there exists a connection that has succeeded up to the login processing. When the processing is not successfully completed in all of the connections, the processing proceeds to step S705 at which "failure" is returned as the result of the connection processing and the processing is terminated. On the other hand, when the processing is successfully completed in at least one of the connections, the processing proceeds to step S706 at which "success" is returned as the result of the connection processing and the processing is terminated.

As described above, in the present embodiment, even when all of the control connections cannot be established in the connection processing, the transfer processing is executed and continued by using some of the control connections that can be established. As a result, the image transfer can be performed to the FTP server which has a limitation on the number of connections that can be simultaneously established. For example, it is assumed that another communication apparatus has already established two connections with the external apparatus in which the number of connections that can be simultaneously established is three. In this case, even if a communication apparatus (digital camera 100) attempts to establish a plurality of connections by connecting to the external apparatus, there is only one connection available (3−2=1). Thus, in this situation, only one connection is allowed to be established. In such a case, the image transfer can be performed by executing and continuing the transfer processing by using some of the control connections that can be established.

According to embodiments of the present disclosure, even if a transfer error occurs in performing data transfer in parallel by using a plurality of connections, it is possible to quickly transition to reconnection processing after disconnection, and it is thus possible to promptly recover from the transfer error.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-032177, filed Mar. 2, 2023, which is hereby incorporated by reference herein in its entirety.

What is claimed is:

1. A communication apparatus having a communication interface, the communication apparatus comprising:
at least one memory that stores a set of instructions; and
at least one processor configured to execute the instructions, the instructions, when executed, causing the communication apparatus to perform operations comprising:
establishing a plurality of connections with an external apparatus for data transfer;
executing transfer processing that transfers data to the external apparatus by using the plurality of connections;
detecting a transfer error in the transfer processing;
executing, in a case where the transfer error is detected in one connection of the plurality of connections, disconnection processing that disconnects the one connection and also disconnects the other connection of the plurality of connections other than the one connection without waiting for an occurrence of timeout of the other connection, wherein the other connection is a connection in which an error does not occur; and
executing restart processing of the communication interface in accordance with the disconnection processing being executed, and trying to re-establish a plurality of connections with the external apparatus in accordance with the restart processing being completed, wherein
in the transfer processing, File Transfer Protocol (FTP) or File Transfer Protocol over SSL/TLS (FTPS) is used as a transfer protocol.

2. The communication apparatus according to claim 1, wherein
the communication apparatus is configured to be allowed to establish a plurality of first connections with a first external apparatus for data transfer, and is configured to be allowed to establish a plurality of second connections with a second external apparatus for data transfer,
in the transfer processing, data is transferred to the first external apparatus by using the plurality of first connections, and data is transferred to the second external apparatus by using the plurality of second connections, and
in the disconnection processing,
in a first case where a transfer error is detected in one connection of the plurality of first connections, the one connection is disconnected and also the other connection of the plurality of first connections other than the one connection is disconnected, and
even in the first case, the plurality of second connections established with the second external apparatus are not disconnected.

3. The communication apparatus according to claim 2, wherein the communication apparatus performs first establishment processing that establishes the plurality of first connections with the first external apparatus based on a first communication setting, and performs second establishment processing that establishes the plurality of second connections with the second external apparatus based on a second communication setting different from the first communication setting.

4. The communication apparatus according to claim 3, wherein
the first communication setting includes information indicating that a type of a LAN is a wireless LAN, and
the second communication setting includes information indicating that the type of the LAN is a wired LAN.

5. The communication apparatus according to claim 1, wherein
the communication apparatus performs first establishment processing that establishes a plurality of first connections with the external apparatus for data transfer based on a first communication setting, and performs second establishment processing that establishes a plurality of second connections with the external apparatus for data transfer based on a second communication setting,
in the transfer processing, data is transferred to the external apparatus by using the plurality of first connections and the plurality of second connections, and
in the disconnection processing,
in a first case where a transfer error is detected in one connection of the plurality of first connections, the one connection is disconnected and also the other connection of the plurality of first connections other than the one connection is disconnected, and even in the first case, the plurality of second connections are not disconnected.

6. The communication apparatus according to claim 1, wherein the operations further comprising:

detecting an error in connection processing that establishes the plurality of connections with the external apparatus; and executing termination processing that terminates a communication operation when the error in the connection processing is detected in all the connections of the plurality of connections, in a case of connecting to an external apparatus having a limitation on a number of connections to be simultaneously established.

7. The communication apparatus according to claim 6, wherein the operations further comprising:

controlling to continue the communication operation, in a case where the error in the connection processing is not detected, by a detection unit, in at least one of the plurality of connections, even when the error in the connection processing is detected in the other one or more of the connections of the plurality of connections, in a case of connecting to the external apparatus having the limitation on the number of connections to be simultaneously established.

8. The communication apparatus according to claim 1, wherein the operations further comprising:

receiving selection of a communication setting based on a user operation; and performing establishment of the connection with the external apparatus based on the communication setting being received.

9. A method for controlling a communication apparatus having a communication interface, the method comprising:

establishing a plurality of connections with an external apparatus for data transfer;

executing transfer processing that transfers data to the external apparatus by using the plurality of connections;

detecting a transfer error in the transfer processing;

executing, in a case where the transfer error is detected in one connection of the plurality of connections, disconnection processing that disconnects the one connection and also disconnects the other connection of the plurality of connections other than the one connection without waiting for an occurrence of timeout of the other connection, wherein the other connection is a connection in which an error does not occur; and executing restart processing of the communication interface in accordance with the disconnection processing being executed, and trying to re-establish a plurality of connections with the external apparatus in accordance with the restart processing being completed, wherein in the transfer processing, File Transfer Protocol (FTP) or File Transfer Protocol over SSL/TLS (FTPS) is used as a transfer protocol.

10. A non-transitory computer-readable storage medium storing a program for causing a computer to execute a method for controlling a communication apparatus having a communication interface, the method comprising:

establishing a plurality of connections with an external apparatus for data transfer;

executing transfer processing that transfers data to the external apparatus by using the plurality of connections;

detecting a transfer error in the transfer processing;

executing, in a case where the transfer error is detected in one connection of the plurality of connections, disconnection processing that disconnects the one connection and also disconnects the other connection of the plurality of connections other than the one connection without waiting for an occurrence of timeout of the other connection, wherein the other connection is a connection in which an error does not occur; and executing restart processing of the communication interface in accordance with the disconnection processing being executed, and trying to re-establish a plurality of connections with the external apparatus in accordance with the restart processing being completed, wherein in the transfer processing, File Transfer Protocol (FTP) or File Transfer Protocol over SSL/TLS (FTPS) is used as a transfer protocol.

* * * * *